(12) United States Patent
Pigott et al.

(10) Patent No.: US 6,434,810 B1
(45) Date of Patent: Aug. 20, 2002

(54) METHOD FOR HIGH VOLTAGE POWERLINE REPAIR

(75) Inventors: Jeffrey W. Pigott, New Oxford; Joseph A. Dineley, Jr., Biglerville, both of PA (US)

(73) Assignee: Agrotors, Inc., Gettysburg, PA (US)

( * ) Notice: Subject to any disclaimer, the term of this patent is extended or adjusted under 35 U.S.C. 154(b) by 0 days.

(21) Appl. No.: 09/505,843

(22) Filed: Feb. 17, 2000

(51) Int. Cl.[7] .............................. B23P 6/00; B63B 35/03
(52) U.S. Cl. .............................. 29/402.01; 254/134.3 R
(58) Field of Search .............................. 29/402.01, 762; 254/134.3 PA, 134.3 R, 134.3 CL; 174/40 R, 45 TD, 40 TD; 248/214, 215

(56) References Cited

U.S. PATENT DOCUMENTS

| | | | |
|---|---|---|---|
| 2,728,462 A | * | 12/1955 | Fincher |
| 4,531,714 A | * | 7/1985 | Bahr .................... 254/134.3 R |
| 4,637,575 A | | 1/1987 | Yenzer .................... 244/118.5 |
| 4,695,039 A | * | 9/1987 | Clossen .................. 254/134 R |
| 5,507,471 A | * | 4/1996 | Mercurio .................... 254/214 |

* cited by examiner

*Primary Examiner*—S. Thomas Hughes
*Assistant Examiner*—John C. Hong
(74) *Attorney, Agent, or Firm*—Nixon Peabody LLP; Donald R. Studebaker

(57) ABSTRACT

A method and apparatus for high voltage powerline repair which includes temporarily attaching a template to a yoke plate which supports a plurality of powerlines from a tower. The template connects to winch lines which are positioned by the template on opposite sides of the yoke plate directly above a powerline. The winch lines extend from the template to a hand winch and from the hand winch to attachments with the powerline on opposite sides of the yoke plate. These hand winches are concurrently operated to draw the powerline on either side of the yoke plate angularly upward toward the template to break the tension on the powerline.

15 Claims, 2 Drawing Sheets

METHOD FOR HIGH VOLTAGE POWERLINE REPAIR

BACKGROUND OF THE INVENTION

High voltage powerlines have been constructed to extend from spaced towers high above terrain which is practically inaccessible to land vehicles. In recent years, a number of methods and devices have been developed to facilitate the repair or high voltage powerlines by helicopter. U.S. Pat. No. 4,637,575 to Yenzer shows a prior art helicopter repair device and method for repairing high voltage powerlines.

Powerlines are often suspended from each support tower by elongate insulators which attach to a yoke plate which in turn supports a plurality of powerlines. Attached to the yoke plate are support shoes, each of which receives and supports a powerline. Often, prolonged vibration of a powerline will cause strands of the line to break in the area where the line engages the support shoe, and in some cases it is desirable to replace the support shoe as well as repair the powerline. These tasks have been extremely difficult and time consuming to perform in the past, as the tension on the powerline must be broken so that the line can be lifted out of the support shoe to facilitate line repair and/or shoe replacement. The tension on the line cannot be easily broken by two linemen with hand winches balanced on the line on either side of the yoke plate who attempt to draw the line toward the yoke plate. In an attempt to alleviate this problem, some linemen have tried to winch the line upward from the crossbar at the top of the tower, but this is not an effective method for breaking the tension on the line. Not only does it require the winching apparatus to extend over a long distance, but it further places a lineman on the tower crossbar far removed from the area where the repair is to be made.

Consequently, the need has arisen for a method and apparatus which will permit linemen to quickly and easily break the tension on high voltage powerlines while remaining in the area of a yoke plate where the repair is to be made.

DISCLOSURE OF THE INVENTION

It is a primary object of the present invention to provide a novel method and apparatus for high voltage powerline repair which includes temporarily attaching a template to the yoke plate to receive and position winch lines on opposite sides of a yoke plate directly above a powerline. The winch lines extend from the template to a hand winch and from the hand winch to attachments with the powerline on opposite sides of the yoke plate.

Another object of the present invention is to provide a novel and improved method and apparatus for high voltage powerline repair wherein winch lines are positioned above and on opposite sides of a yoke plate and are directly aligned above a powerline supported by the yoke plate. The winch lines extend downwardly at an angle to connections with the powerline spaced outwardly on opposite sides of the yoke plate, and are used to draw the powerline upwardly toward the yoke plate to raise the powerline out of contact with the yoke plate.

A still further object of the present invention is to provide a novel and improved template for powerline assembly repair which includes a substantially T shaped body having a lower section for engaging a yoke plate between the powerlines supported thereby and an upper section which extends laterally outward on either side of the lower section. The upper section supports oppositely disposed winch line connectors with a pair of oppositely disposed winch line connectors aligned above each powerline supported by a yoke plate.

These and other objects of the present invention include a method and apparatus for powerline assembly repair where a powerline is supported from a support assembly, such as a yoke plate support assembly, which is suspended from a tower. The basic method involves concurrently drawing the powerline upwardly at an angle toward a level above the support assembly from first and second positions on the powerline spaced outwardly from the support assembly on opposite sides thereof. This breaks the tension on the powerline and raises it out of contact with the support assembly so that repairs can be made before the powerline is returned to contact with the support assembly. To enable drawing the powerline upwardly toward a level above a yoke plate support assembly, a template is attached to the yoke plate support assembly in spaced relation to the powerlines supported by the yoke plate support assembly with the template extending above the yoke plate support assembly but within the field of safe working distance for the energized powerlines. A first winch assembly is extended from a first connection with a first side of the template above the yoke plate support assembly to extend downwardly at an angle to a first connection with the powerline at a point spaced outwardly from a first side of the yoke plate support assembly. A second winch assembly is extended from a second connection with a second side of the template opposite to the first side and above the yoke plate support assembly downwardly at an angle to a second connection with the powerline at a point spaced outwardly from a second side of the yoke plate support assembly which is opposite to the first side of the yoke plate support assembly. The first and second connections with the template are in alignment with each other and are aligned with the powerline, while the first and second connections with the powerline are substantially equally spaced from the yoke plate support assembly. The winch assemblies are concurrently operated to draw the powerline upwardly toward the template to break the tension on the powerline and raise it out of contact with the yoke plate support assembly.

DESCRIPTION OF THE PREFERRED EMBODIMENTS

Figure 1:
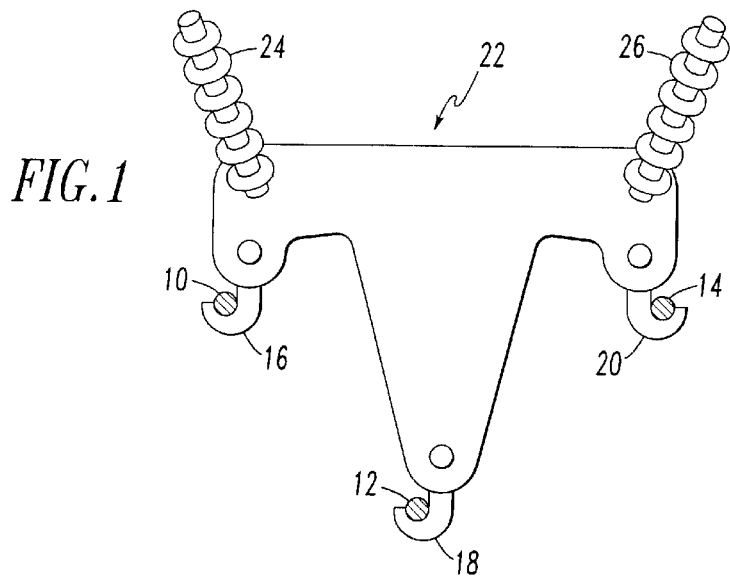
FIG. 1 is a view in front elevation of a yoke plate supporting high voltage powerlines.

Referring now to FIG. 1, a plurality of high voltage powerlines 10, 12 and 14 are conventionally supported by support shoes 16, 18 and 20 secured to a yoke plate 22. This yoke plate is supported by elongate insulators 24 and 26 which are attached to a tower structure (not shown). The powerlines extend over substantial distances and are supported by yoke plates mounted on spaced towers.

Powerlines are normally formed by a plurality of tightly entwined strands of wire, and sometimes line vibration causes separation of the wire strands in the area of contact with the support shoe. This necessitates powerline repair in the area of the strand separation, and in some cases, support shoe replacement is also required.

To either replace a support shoe or to repair a powerline in the area of contact with support shoe, it is necessary to raise the powerline off the support shoe so that the repair can be made. In the past, this has been an extremely difficult and time consuming task, for due to its length and weight, each powerline is under a high degree of tension which must be overcome if enough slack is to be formed in the powerline to permit removal from the support shoe. This task has been made even more difficult by the fact that it must be performed by linemen balanced on the powerlines high above the terrain and often in remote, almost inaccessible areas. It has proven difficult for linemen in this position to generate the force necessary to break the tension on a powerline.

Applicants have discovered that the tension on a powerline can more easily be broken by concurrently drawing the line on opposite sides of the yoke plate upwardly and inwardly at substantially equal angles. This breaks the tension on the line and causes slack at the yoke plate which permits removal of the line from the support shoe. It is necessary with an energized powerline for this be achieved within the field of safe working distance set by OSHA for powerlines of specific voltages. This field of safe working distance assures that operations occur well within the electromagnetic field surrounding a group of energized powerlines. For example, for lines carrying 500 KV, the safe working distance is twelve feet six inches from phase to ground.

Figure 2:
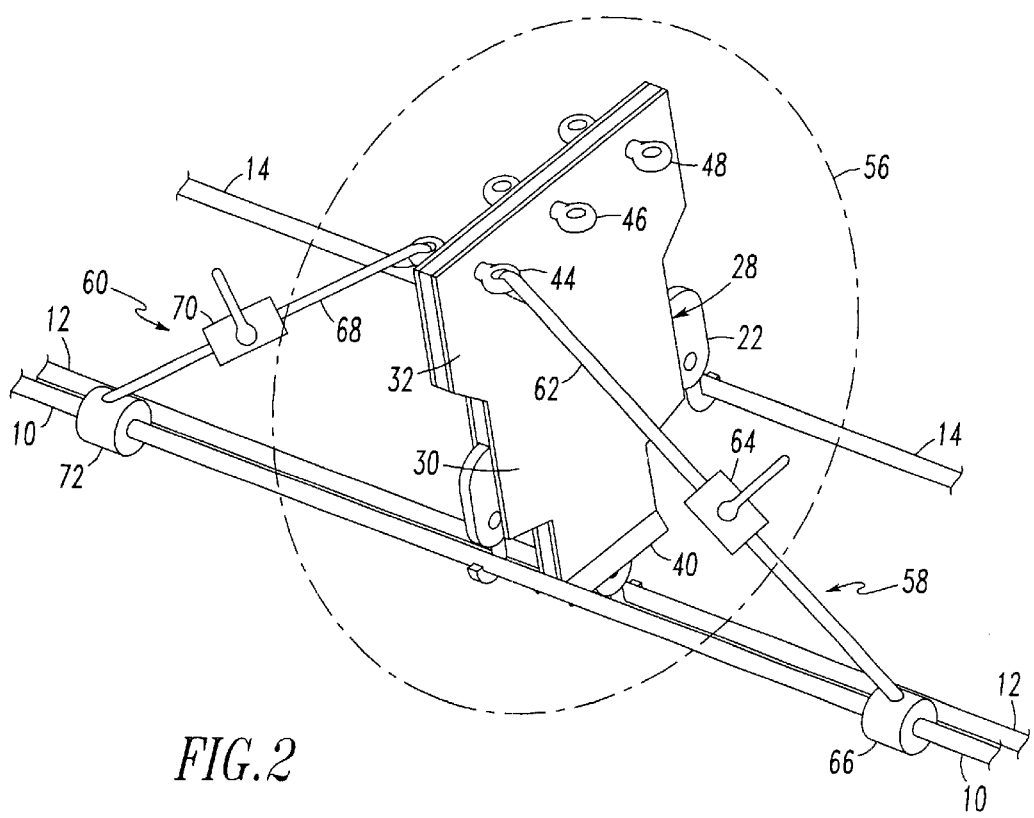
FIG. 2 is a perspective view of the template and winch assemblies of the present invention mounted on a yoke plate and connected to a powerline.
Figure 4:
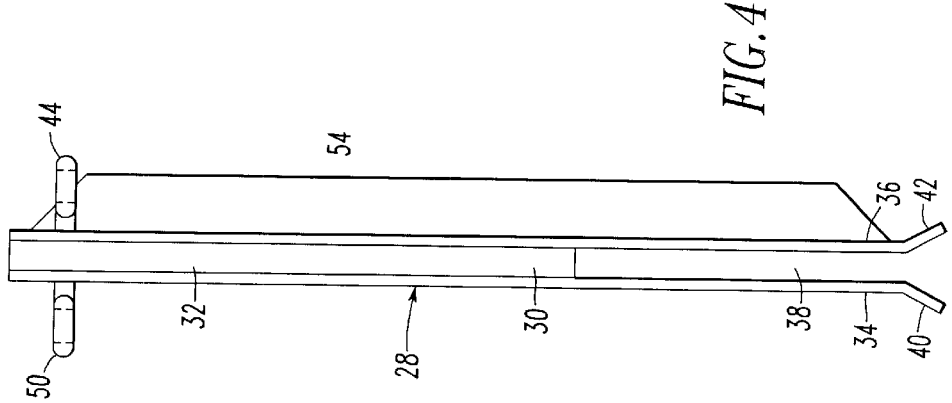
FIG. 4 is a view of side elevation of the template of FIG. 3.
Figure 3:
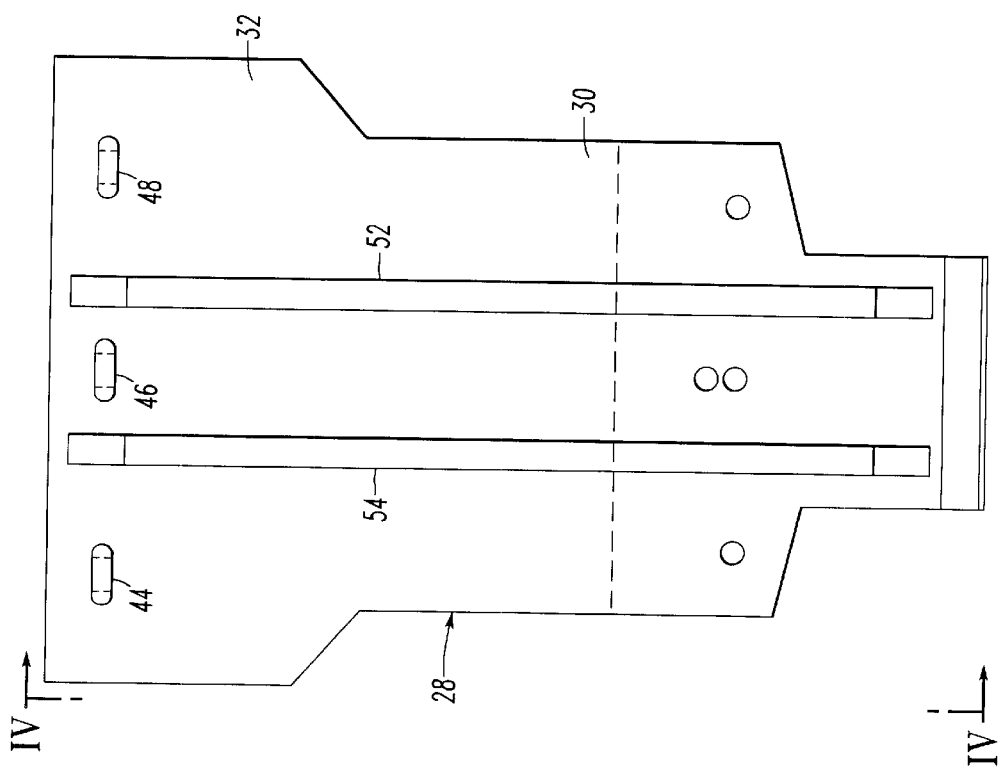
FIG. 3 is a view in front elevation of the template of FIG. 2.

Referring to FIGS. 2–4, the method of the present invention is performed by attaching a template 28 to the yoke plate 22. This template is substantially T shaped in configuration and includes a lower section 30 and an upper section 32 which extends laterally outward above the lower section. The lower section is centrally and transversely divided to form two, downwardly extending spaced legs 34 and 36 separated by a channel 38. At the open end of the channel, outwardly angled elongate guide pieces 40 and 42 are provided.

The upper section 32 supports oppositely extending winch line connections 44, 46 and 48 on one side of the template and three winch line connections, one of which is shown at 50, on the opposite side of the template which are directly opposite to and aligned with the winch line connections 44, 46 and 48. These winch line connections can be projecting eye bolts which receive a hook or similar connector on the end of a winch line.

The template 28 may be formed of aluminum or other metals and may be reinforced by spaced bars 52 and 54 secured to a surface of the template. As illustrated by FIG. 2, the template 28 is designed to slide down over the top of the yoke plate 22. The yoke plate is received in the channel 38 with the legs 34 and 36 in engagement with opposite surfaces of the yoke plate. The angled guide pieces 40 and 42 aid in guiding the yoke plate into the channel 38, particularly when the template 28 is lowered into position by helicopter.

It will be noted from FIG. 2 that when the template 28 is engaged with the yoke plate 22, the winch line connections 44, 46 and 48 are directly aligned above the powerlines 10, 12 and 14 respectively. This is also true of winch connections disposed opposite to the winch connections 44, 46 and 48. The lower section 30 is spaced from each of the powerlines 10, 12 and 14 when engaged with the yoke plate, and is no more than 24 inches in width to maintain this spacing with most powerline assemblies. The upper section 32 extends above the yoke plate but is dimensioned to remain within the safe working distance 56 for the powerlines involved.

To repair a powerline assembly at the yoke plate 28 in the contact area for the powerline 10, two linemen on the powerlines guide to the template 28 into place over the yoke plate 22. The linemen may first be discharged onto the powerlines from a helicopter which then lowers the template onto the yoke plate. Ideally, the template is lowered with winch assemblies 58 and 60 attached to the winch line connectors 44 and 50 respectively. The winch assembly 58 includes a winch line 62 connected at one end to the winch line connector 44, to a lever hoist or winch 64 and to a grip 66 to be secured to the line 10. Similarly, the winch assembly 60 includes a winch line 68 secured to the winch line connector 50, to a lever hoist or winch 70 and to a grip 72 to be secured to the line 10. Preferably the grips 66 and 72 are attached by the linemen to the line 10 substantially equal distant from the yoke 22 so that the upward angles formed by the winch assemblies 58 and 60 are substantially equal.

With the winch assemblies connected in place, linemen on opposite sides of the yoke plate 22 concurrently operate the lever hoists 64 and 70 to draw the powerline 10 upwardly at an angle and inwardly toward the template 28. This breaks the tension on the powerline and is continued until the slack powerline created between the grips 66 and 70 is sufficient to raise the powerline off of the shoe 16. This slack is maintained while repair to the powerline assembly is made, and then operation of the lever hoists 64 and 70 is concurrently reversed to reseat the powerline 10 on the shoe 16. Now the grips 66 and 72 are released by the linemen and the template 28 is removed manually or by helicopter lift.

We claim:

1. A method for powerline assembly repair in an area where a powerline under tension is supported on a support assembly suspended from a tower which includes:

concurrently drawing said powerline upwardly and inwardly at substantially equal angles toward said support assembly from opposite sides of said support assembly toward a level above said support assembly from first and second positions on said powerline spaced outwardly at substantially equal distances from said support assembly on opposite sides thereof to break the tension on said powerline and raise said powerline out of contact with said support assembly, maintaining said powerline out of contact with said support assembly while repairing the powerline assembly;

and subsequently permitting said first and second position on said powerline to move downwardly and outwardly relative to said support assembly to return said powerline into contact with said support assembly.

2. The method of claim 1 wherein said level above said support assembly is above and in alignment with said powerline.

3. The method of claim 1 wherein said level above said support assembly is within a field of safe working distance for energized powerlines supported by said support assembly.

4. The method of claim 3 wherein said level above said support assembly is above and in alignment with said powerline.

5. A method for powerline assembly repair in an area where a powerline under tension is supported on a yoke plate support assembly suspended from a tower which supports one or more powerlines, said method including:

attaching a template to the yoke plate support assembly in spaced relation to powerlines supported on the yoke plate support assembly with the template extending upwardly from the yoke plate support assembly, extending a first winch assembly from a first connection with a first side of said template above said yoke plate support assembly and downward at an angle to a connection with said powerline at a first position spaced outwardly from a first side of said yoke plate support assembly, extending a second winch assembly from a second connection with a second side of said template opposite to said first side and above said yoke plate support assembly and downwardly at an angle to a connection with said powerline at a second position spaced outwardly from a second side of said yoke plate support assembly, which is opposite to said first side of said yoke plate support assembly, concurrently operating said first and second winch assemblies to draw said powerline upwardly at an angle toward said template and toward a level above said yoke plate support assembly from said first and second positions on said powerline spaced outwardly from said yoke plate support assembly on opposite sides thereof to break the tension on said powerline and raise said powerline out of contact with said yoke plate support assembly, maintaining said powerline and of contact with said yoke plate support assembly while repairing the powerline assembly;

and subsequently permitting said first and second positions of said powerline to move downwardly and outwardly relative to said yoke plate support assembly to return said powerline into contact with said yoke plate support assembly.

6. The method of claim 5 which includes:

transporting first and second linemen by helicopter to the powerlines and off loading the linemen onto the powerlines in the area of the yoke plate support assembly, lowering said template from a helicopter for attachment by the linemen to the yoke plate support assembly, attachment by the linemen of the template to the yoke plate support assembly in spaced relation to the powerlines supported on the yoke plate support assembly with the template extending upwardly from the yoke plate support assembly, extension by the linemen of a first winch assembly from a first connection with a first side of said template above said yoke plate support assembly and downward at an angle to a connection by said linemen of the first winch assembly with said powerline at a point spaced outwardly from a first side of said yoke plate support assembly, extension by said linemen of a second winch assembly from a second connection with a second side of said template opposite to said first side and above said yoke plate support assembly and downward at an angle by said lineman of the second winch assembly with said powerline at a point spaced outwardly from a second side of said yoke plate support assembly which is opposite to said first side of said yoke plate support assembly, concurrently operating said first and second winch assemblies by said first and second linemen respectively to draw said powerline upwardly at an angle toward said template to break the tension on said powerline and raise said powerline out of contact with said yoke plate support assembly, maintaining said powerline out of contact with said yoke plate support assembly during repair of said powerline assembly by said linemen, operating said first and second winch assemblies by said first and second linemen respectively to move said powerline downwardly and outwardly relative to said yoke plate support assembly to reseat said powerline on said yoke plate support assembly, disconnection by said linemen of said first and second winch assemblies from said powerline, and lifting by said helicopter of said template from said yoke plate support assembly.

7. The method of claim 6 wherein said helicopter lowers said template with said first and second winch assemblies attached to the first and second connections respectively.

8. The method of claim 6 wherein said first and second connections with said template are above and in alignment with said powerline.

9. The method of claim 6 wherein said template extends above said yoke plate support assembly for a distance which is within a field of safe working distance for energized powerlines supported by said yoke plate support assembly.

10. The method of claim 6 wherein said template includes a unitary substantially T shaped body formed with a lower section for engaging said yoke plate support assembly between the powerlines supported thereby and an upper section which extends laterally outwardly on either side of said lower section above said powerlines when said lower section is engaged with said yoke plate support assembly, said lower section being centrally and transversely divided to form two spaced legs, said linemen attaching said template to said yoke plate support assembly by inserting said T shaped body lower section between said powerlines with the spaced legs of said template over said yoke plate support assembly with said yoke plate support assembly positioned between said spaced legs.

11. The method of claim 5 wherein said level above said yoke plate support assembly is above and in alignment with the powerline when the powerline is supported on the yoke plate support assembly.

12. The method of claim 11 wherein said level above said yoke plate support assembly is within the field of safe working distance for energized powerlines supported on the yoke plate support assembly.

13. The method of claim 5 wherein said first and second positions are spaced outwardly at substantially equal distances from said yoke plate support assembly.

14. The method of claim 13 wherein said template is attached to said yoke plate support assembly with said first and second connections of said first and second winches respectively with said template above and in alignment with said powerline.

15. The method of claim 14 wherein said first and second connections are positioned in alignment on the first and second sides of said template respectively.

* * * * *